United States Patent [19]

Boddy et al.

[11] Patent Number: 4,679,758
[45] Date of Patent: Jul. 14, 1987

[54] EXTERIOR REARVIEW MIRRORS FOR VEHICLES

[75] Inventors: Ian Boddy, Bognor Regis; Shaun Gurteen, Chichester, both of England

[73] Assignee: Britax Wingard Limited, Chichester, England

[21] Appl. No.: 758,475

[22] Filed: Jul. 23, 1985

[30] Foreign Application Priority Data

Aug. 18, 1984 [GB] United Kingdom ............... 8421050
May 29, 1985 [GB] United Kingdom ............... 8513552

[51] Int. Cl.⁴ .................................................. A47G 1/24
[52] U.S. Cl. ........................................ 248/479; 248/900
[58] Field of Search ............... 248/479, 549, 548, 900

[56] References Cited

U.S. PATENT DOCUMENTS

| 3,655,062 | 4/1972 | Curry | 248/549 X |
| 3,703,270 | 11/1972 | Tomlin | 248/549 |
| 4,268,122 | 5/1981 | Deshaw | 248/900 X |
| 4,548,483 | 10/1985 | Moro et al. | 248/549 X |
| 4,558,840 | 12/1985 | Manzoni | 248/549 |

FOREIGN PATENT DOCUMENTS

| 2838465 | 3/1980 | Fed. Rep. of Germany | 248/900 |
| 1236575 | 6/1960 | France | 248/900 |
| 1479428 | 5/1967 | France | 248/900 |

Primary Examiner—Reinaldo P. Machado
Assistant Examiner—Sarah A. Lechok Eley
Attorney, Agent, or Firm—Hayes, Davis & Soloway

[57] ABSTRACT

An exterior mirror for a vehicle comprises a base member adapted to be mounted on the vehicle body, first pivotal engagement means mounted on an arm secured to the base member so as to project laterally from the vehicle body, a housing for a reflective member having second pivotal engagement means, and resilient means for urging the first and second pivotal engagement means into engagement with one another so that the housing is pivotally movable relative to the base member about a first pivot axis. First abutment means on the housing and second abutment means on the base member closer to the vehicle body than the first pivot axis are so arranged that that movement of the end of the housing remote from the base member in a predetermined direction causes angular movement about the first pivot axis, bringing the first abutment means into engagement with the second abutment means, continued movement of the end of the housing remote from the base member in said predetermined direction causing angular movement of the housing about a second pivot axis coincident with the point of engagement of said abutment means and resulting in mutual disengagement of the first and second pivotal engagement means. The resilient means is coupled to said point on the base member by a link which is pivotally attached to the base member at said point, the link being movable between a first position in which the line of action of the spring pulls the housing towards its position of normal use and a second position in which the spring pulls the housing towards the body of the vehicle.

9 Claims, 7 Drawing Figures

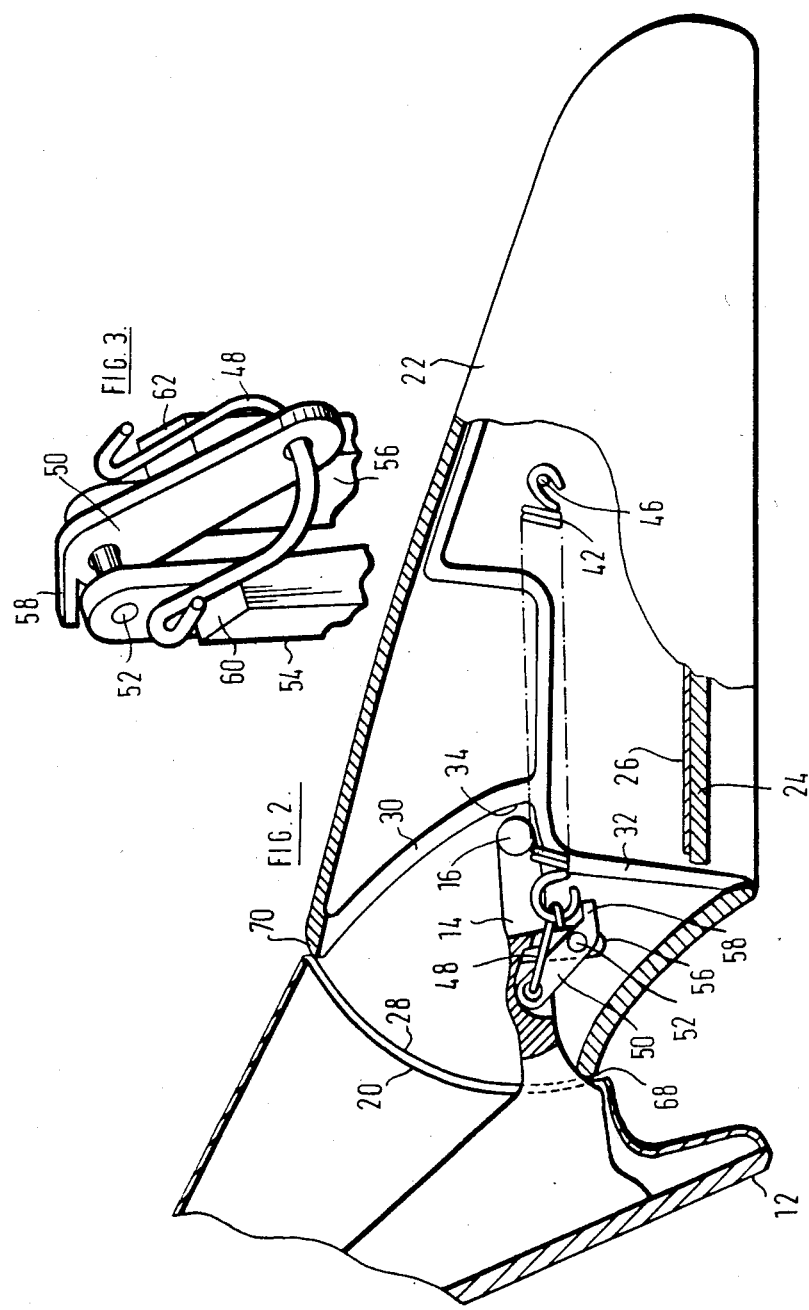

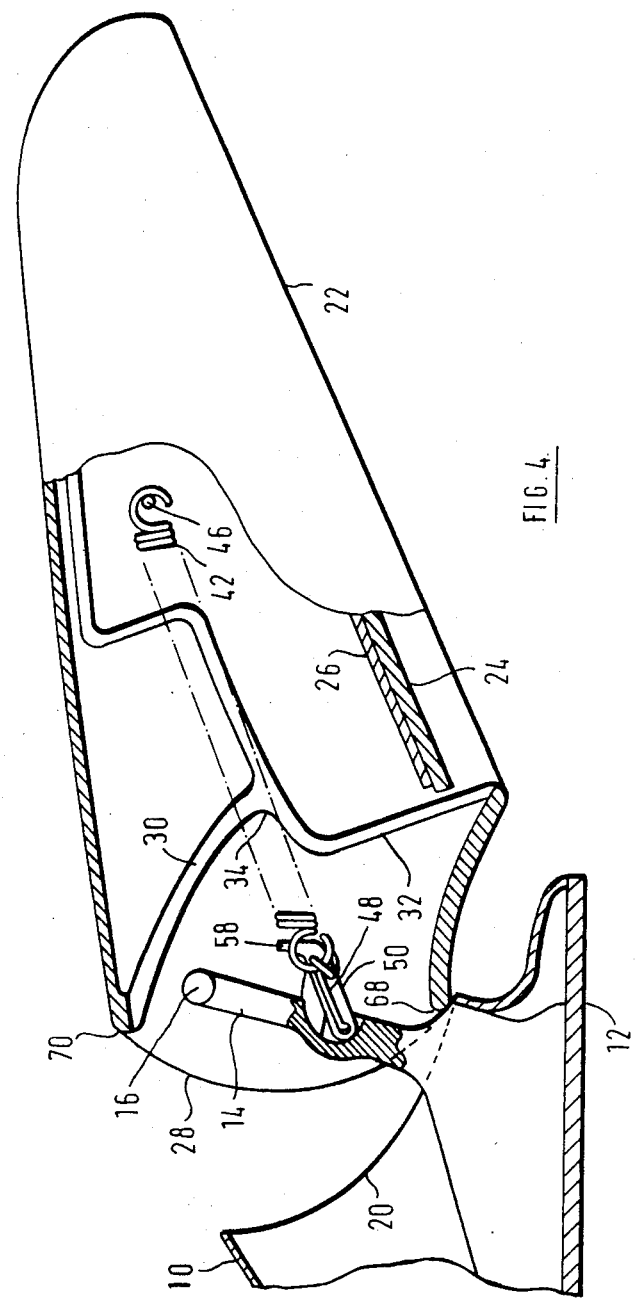

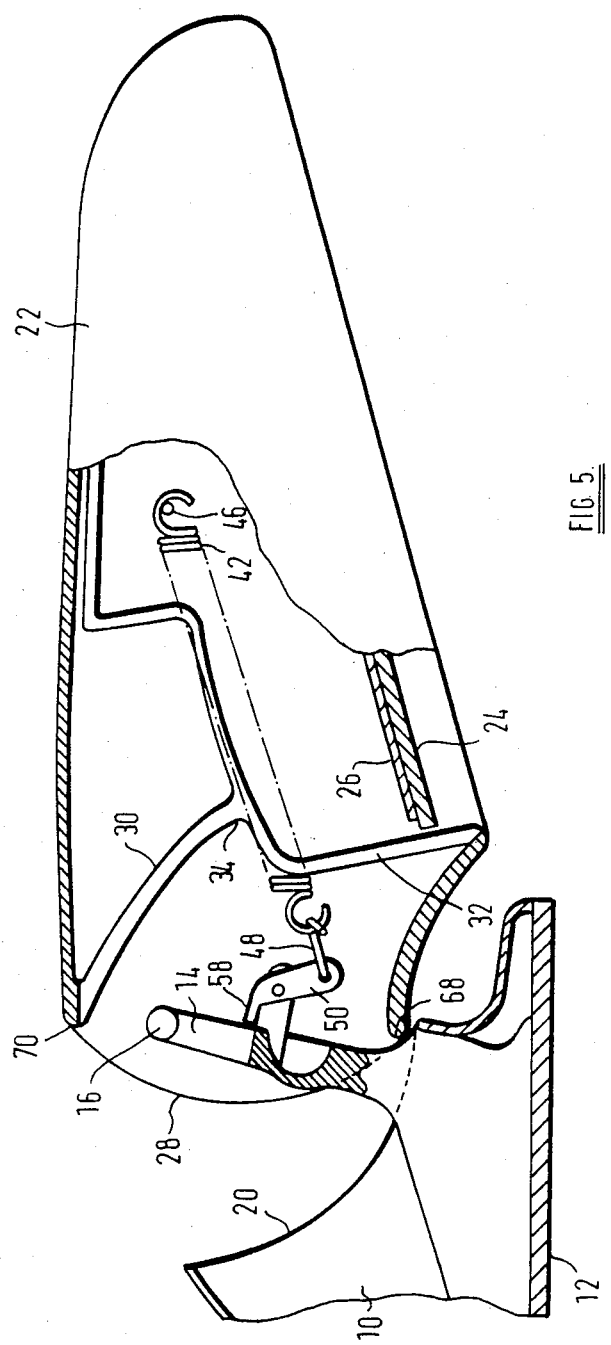

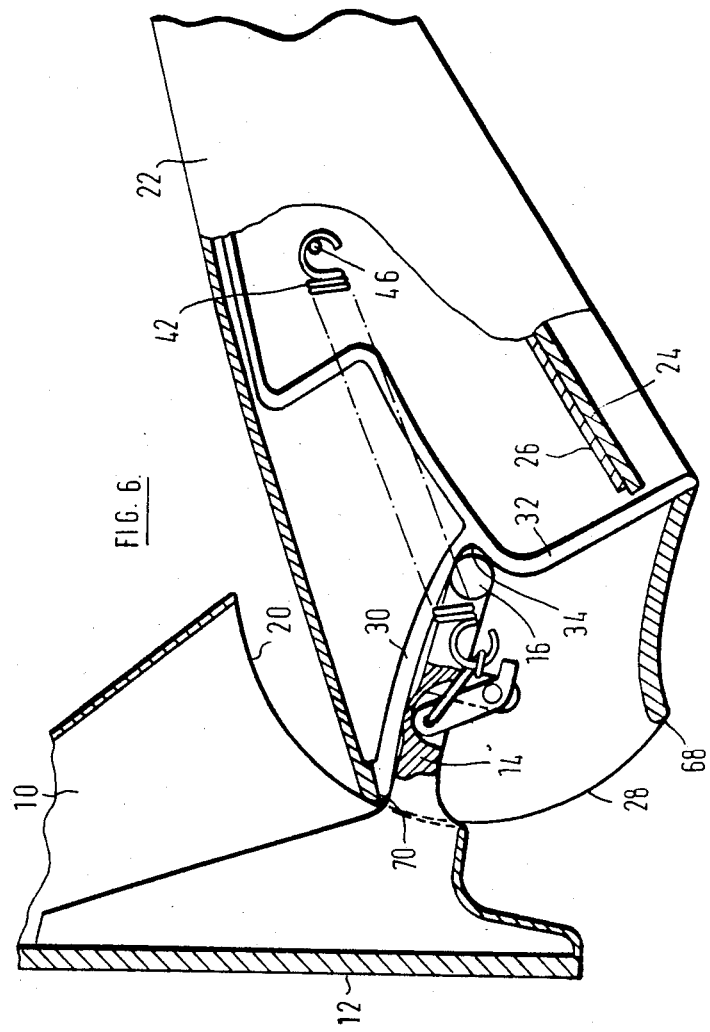

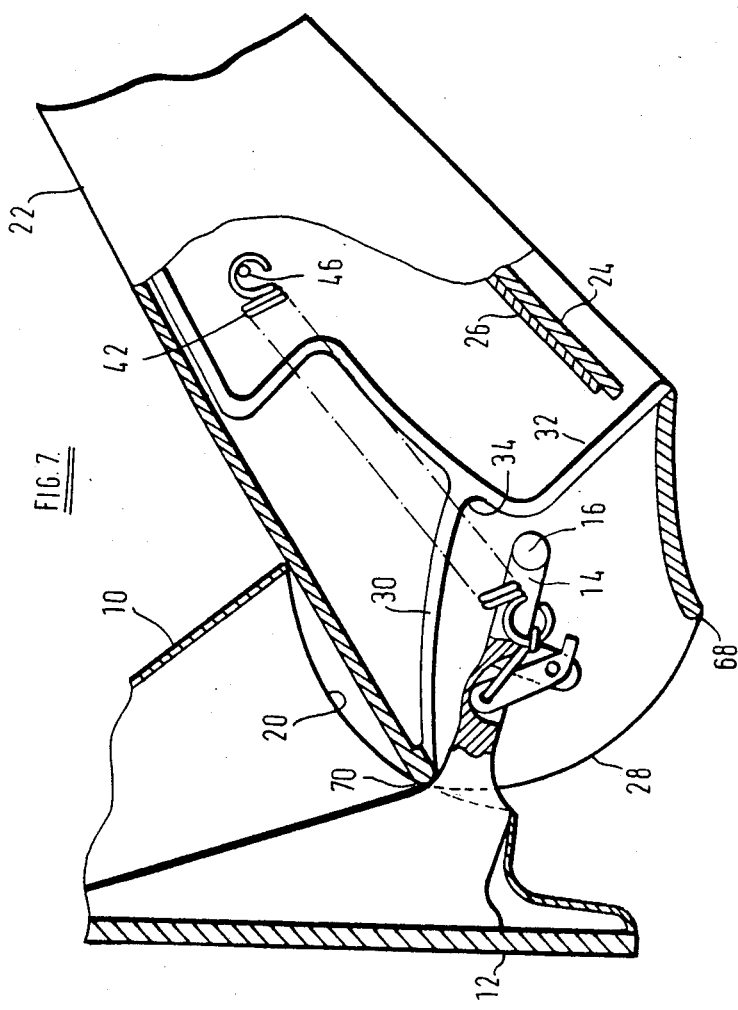

EXTERIOR REARVIEW MIRRORS FOR VEHICLES

This invention relates to exterior rearview mirrors for vehicles of the type which are adapted to pivot backwards against the vehicle body in the event of impact from the front and forward against the vehicle body in the event of impact from the rear.

In the interests of both styling and aerodynamic efficiency, it has become customary for the housings of mirrors of the foregoing type to be of substantial thickness in the direction of movement of the vehicle in the region where the housing abuts the vehicle body and to taper outwardly from the vehicle. Hitherto, it has been customary to provide such mirrors with two vertical hinge axes, one coincident with the front surface of the housing, about which the mirror pivots forwardly, and the other coincident with the rear surface of the housing about which the mirror folds rearwardly. This arrangement suffers from two disadvantages.

Firstly, even when the mirror has pivoted to a position lying parallel to the side of the vehicle, its extent of projection is equal to the maximum thickness of the housing. In order to alleviate this disadvantage, the pivot axes are sometimes located at a position outboard of the vehicle where the mirror housing is thinner but the minimum projection when the mirror is in its fully pivoted position is then limited by this location of the pivot axes.

The second disadvantage is that, when a remote control mechanism is provided to adjust the orientation of the reflective surface within the housing, the actuating mechanism either has to go through a dislocation and relocation routine as the mirror is pivoted forwardly or backwardly and then returned to its initial position or alternatively has to make provision for very large displacement with the associated problem of storage of excess length of cable or other linkage means during conditions of normal use.

The present invention aims to overcome the foregoing disadvantages.

According to the invention, in one aspect, an exterior mirror for a vehicle comprises a base member having a mounting face adapted to engage with the vehicle body, first pivotal engagement means mounted on an arm secured to the base member so as to project laterally in the opposite direction to the mounting face, a housing for a reflective member having second pivotal engagement means, resilient means for urging the first and second pivotal engagement means into engagement with one another so that the housing is pivotally movable relative to the bracket about a first pivot axis, first abutment means on the housing and second abutment means on the base member closer to the mounting face than the first pivot axis and positioned so that movement of the end of the housing remote from the base member in a predetermined direction causes angular movement about the first pivot axis, bringing the first abutment means into engagement with the second abutment means, and continued movement of the end of the housing remote from the base member in the same direction as its movement during said pivotal movement causes angular movement of the housing about a second pivot axis coincident with the point of engagement of said abutment means, resulting in mutual disengagement of the first and second pivotal engagement means.

Since the second abutment means is closer to the mounting face of the base member than is the first pivotal engagement means, the invention combines the advantage of having a pivot axis at a location where the housing is thinner than immediately adjacent to the vehicle body with the advantages obtained by having a pivot axis as close to the vehicle body as possible.

In a preferred form of the invention, the housing also has third abutment means arranged to engage with fourth abutment means on the base member when the housing is pivoted from its position of normal use in the opposite direction to that in which the first abutment means engages with the second abutment means.

In a preferred form of the invention, the resilient means comprises a tension spring extending between a point on the base member which is nearer to the mounting face than the first pivot axis with a point in the interior of the housing which is further from the mounting face than the first pivot axis when the housing is in its position of normal use. With this arrangement, the force urging the first and second pivotal engagement means into engagement with one another is at a maximum when the line of action of the tension spring passes through the first pivot axis and decreases as the housing pivots forwardly or backwardly until one or other of the abutment means comes into engagement with its second abutment means whereafter the force exerted by the spring increases as the first and second pivotal engagement means move apart from one another. This has the result that, once displacement of the housing from its position of normal use has commenced, the tension spring tends to accelerate it towards its folded position, thereby reducing the effect of the imparct causing such displacement.

According to the invention, in another aspect, an exterior mirror for a vehicle comprises a base member having a mounting face adapted to engage with the vehicle body, first pivotal engagement means mounted on an arm secured to the base member so as to project laterally in the opposite direction to the mounting face, a housing for a reflective member having second pivotal means, resilient means for urging the first and second pivotal engagement means into engagement with one another so that the housing is pivotally movable relative to the bracket about a pivot axis, the resilient means extending between a point on the base member which is nearer to the mounting face than the first axis and a point in the interior of the housing which is further from the mounting face than the first pivot axis when the housing is in its position of normal use, the resilient means being coupled to said point on the base member by a link which is pivotally attached to the base member at said point, the link being movable between a first position in which the line of action of the spring pulls the housing towards its position of normal use and a second position in which the spring pulls the housing towards the mounting face.

This aspect of the invention thus provides a stable position in which the housing may remain folded parallel to the vehicle body.

An embodiment of the invention will now be described, by way of example, with reference to the accompanying drawings in which:

FIG. 2 is a partially broken away plan view from above of the mirror shown in FIG. 1;

FIG. 3 is a scrap perspective view of a component of the mirror shown in FIGS. 1 and 2;

FIG. 4 is a view similar to FIG. 2 but showing the mirror housing in a partially displaced orientation after impact from the front;

FIG. 5 is a view similar to FIG. 4 but showing the housing in its position of maximum rearward displacement;

FIG. 6 is a view similar to FIG. 2 but showing the housing in a partially forwardly displaced orientation following impact from behind; and FIG. 7 is a view similar to FIG. 6 but showing the housing in its position of maximum forward displacement.

Figure 1:
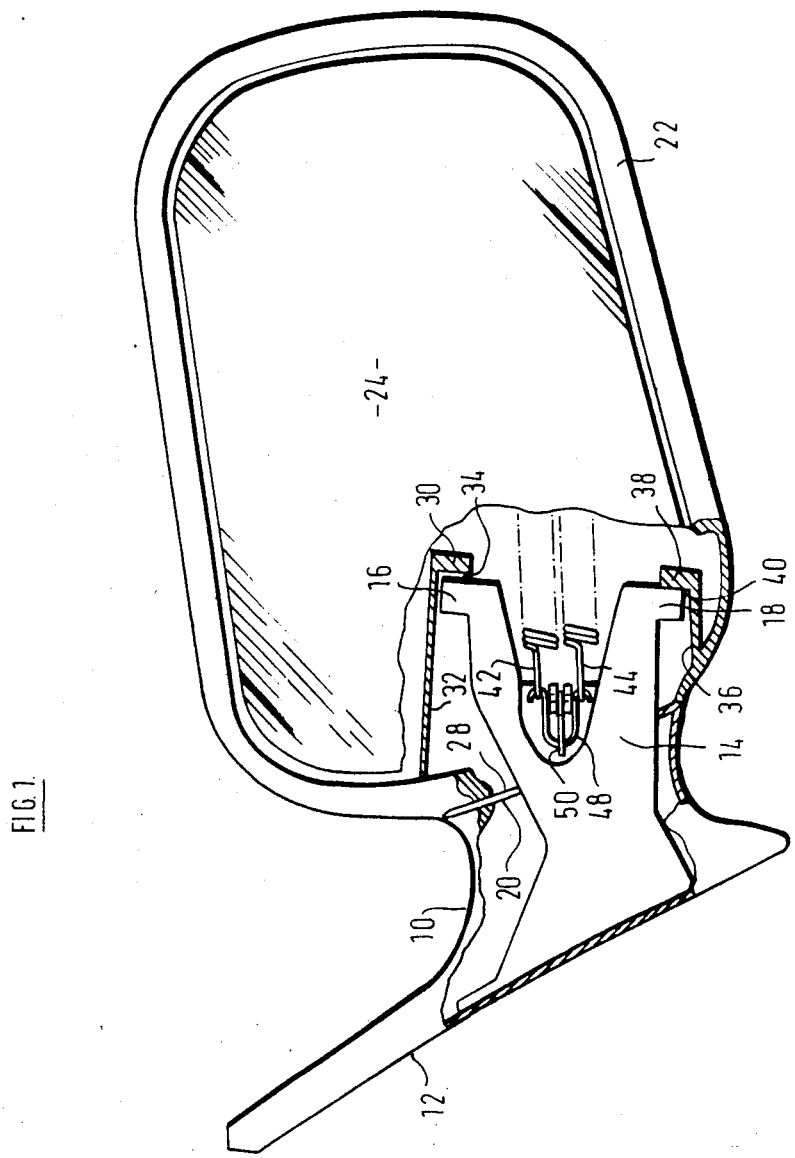
FIG. 1 is a partially broken away view from the rear of a vehicle rearview mirror in accordance with the invention, in its position of normal use.

Referring first to FIGS. 1 and 2, a rearview mirror comprises a hollow base member 10 having a face 12 adapted to abut against the side of the body of a motor vehicle when the mirror is mounted thereon. The base member 10 includes an outwardly projecting arm 14 having two stub axles 16 and 18 on its outer end which are aligned on a common vertical first pivot axis and which constitute first pivotal engagement means. The outer periphery 20 of the base member 10 is part-cylindrical, centred on the pivot axis formed by the stub axles 16 and 18.

A mirror housing 22 contains a reflective member 24 mounted on a carrier 26 whose orientation relative to the housing 22 can be varied by means not shown. The housing 22 has a cylindrical periphery 28 which abuts the periphery 20 of the base member 10 when the housing 22 is in its position of normal use, the abutting faces being open and the arm 14 projecting into the interior of the housing 22. Within the housing, two reinforcement members 30 and 32 abut to define a recess 34 in which the stub axle 16 is received and corresponding members 36 and 38 define a similar recess 40 for the stub axle 18. The recesses 34 and 40 constitute second pivotal engagement means.

A pair of tension springs 42 and 44 extend between respective attachment points 46 within the housing 22 and a stirrup 48 which is coupled by a link 50 to a pivot bearing rod 52. As can be seen from FIGS. 2 and 3, the rod 52 is mounted between two limbs 54 and 56 which project laterally from the arm 14 and are formed integrally therewith. The link 50 has a heel 58 which serves a purpose to be explained hereinafter. Each of the limbs 54 and 56 has a respective shoulder 60, 62 for engagement with the stirrup 48.

When the housing 22 is in its position of normal use, as illustrated in FIG. 2, an edge 68 thereof constituting first abutment means, abuts the arm 14 on a side face thereof which constitutes second abutment means. The line of action of the springs 42 and 44 passes between the point of engagement of the stub axles 16 and 18 in their respective recesses 34 and 40 on the one hand and the point of engagement of the edge 68 with the arm 14 on the other, thus holding the housing 22 in a stable condition.

If the housing 22 is subject to impact from the front, i.e. from the opposite side to that from which the reflective member 24 is visible, the housing 22 pivots on the point of abutment between the edge 54 and the arm 14, disengaging the recesses 34 and 40 from the stub axles 16 and 18 respectively and permitting the housing to move towards the position illustrated in FIG. 4, in which the stirrup 48 is out of contact with the shoulder 60 and 62 (FIG. 3) and, together with the link 50, is in alignment with the line of action of the springs 42 and 44.

Provided that the impact is not sufficient to displace the housing 22 beyond the position illustrated in FIG. 4, the housing 22 is pulled back to its position of normal use (FIG. 2) as soon as the displacing force ceases to act. However, if the housing 22 is moved beyond the position illustrated in FIG. 4, the stirrup 48 and the link 50 go over-centre to the position illustrated in Figure 5, in which the heel 58 on the link 50 abuts against the arm 14. The housing 22 is then held in this position until restored manually to the position illustrated in FIG. 2.

On the other hand, if, when in its position of normal use, the housing 22 is subject to impact from the rear, it pivots forwardly about the stub axles 16 and 18 until its front edge 70 which constitute third abutment means engages with the arm 14 on a side face thereof which constitutes fourth abutment means, as illustrated in FIG. 6. Continued forward movement of the outer edge of the housing 22 causes the recesses 34 and 40 to disengage from the stub axles 16 and 18 as the housing 22 pivots abut the points of engagement between the edge 70 and the arm 14, the housing 22 moving to its furthest forward position as illustrated in FIG. 7. Abutment of the stirrup 48 with the shoulders 60 and 62 limits forward movement of the former so as to prevent undue relaxation of the springs 42 and 44, thus ensuring that the housing 22 is pulled back to its position of normal use, as illustrated in FIG. 2, as soon as the displacing force ceases to act.

We claim:

1. An exterior mirror for a vehicle comprising a base member having a mounting face adapted to engage with the vehicle body, first pivotal engagement means mounted on an arm secured to the base member so as to project laterally in the opposite direction to the mounting face, a housing for a reflective member having second pivotal engagement means, a first link pivotally attached to the base member at a point which is nearer to the mounting face than the first pivot axis, a stop on the first link a stop arranged to engage with a formation on the base member to limit pivotal movement of the link, a second link pivotally attached to the first link, and resilient means for urging the first and second pivotal engagement means into engagement with one another so that the housing is pivotally movable relative to the base member about a pivot axis formed by said first and second pivotal engagement means, the resilient means extending between the second link and a point in the interior of the housing which is further from the mounting face than said pivot axis when the housing is in its position of normal use, and the links being movable between a first position in which the line of action of the spring pulls the housing towards its position of normal use and the second link engages with a formation on the base member to limit pivotal movement of the links, and a second position in which the spring pulls the housing towards the mounting face and the stop on the first link engages with the base member.

2. An exterior mirror according to claim 1, further comprising first abutment means on the housing and second abutment means on the base member closer to the mounting face than said first-mentioned pivot axis, the first and second abutment means being positioned so that movement of the end of the housing remote from the base member in a predetermined direction causes angular movement about the first pivot axis, bringing the first abutment means into engagement with the second abutment means, and continued movement of the end of the housing remote from the base member in said predetermined direction causes angular movement of the housing about a second pivot axis coincident with the point of engagement of said abutment means, resulting in mutual disengagement of the first and second pivotal engagement means.

3. An exterior mirror according to claim 2, wherein the housing also has third abutment means and the base member has fourth abutment means arranged to engage with the third abutment means when the housing is pivoted from its position of normal use in the opposite direction to that in which the first abutment means engages with the second abutment means.

4. An exterior mirror according to claim 3, wherein the resilient means comprises a tension spring extending between a point on the base member which is nearer to the mounting face than the first pivot axis and a point in the interior of the housing which is further from the mounting face than the first pivot axis when the housing is in its position of normal use.

5. An exterior mirror according to claim 4, further comprising a link pivotally coupling the resilient means to said point on the base member, said link being movable between a first position in which the line of action of the spring pulls the housing towards its position of normal use and a second position in which the spring pulls the housing towards the mounting face.

6. An exterior mirror according to claim 5, wherein the link carries a stop arranged to engage with a formation on the base member to limit pivotal movement of the link when it is in its second position.

7. An exterior mirror according to claim 6, wherein a second link is pivotally connected between the resilient means and the link and is arranged to engage with a formation on the base member to limit pivotal movement of the links when the first link is in its first position.

8. An exterior mirror for a vehicle comprising a base member having a mounting face adapted to engage with the vehicle body, first pivotal engagement means mounted on an arm secured to the base member so as to project laterally in the opposite direction to the mounting face, a housing for a reflective member having second pivotal engagement means, resilient means for urging the first and second pivotal engagement means into engagement with one another so that the housing is pivotally movable relative to the base member about a first pivot axis, first abutment means on the housing and second abutment means on one side of the arm closer to the mounting face than the first pivotal engagement means, third abutment means on the housing and fourth abutment means on the opposite side of the arm to the second abutment means closer to the mounting face than the first pivotal engagement means, the first and second abutment means being positioned so that movment of the end of the housing remote from the base member in a predetermined direction first causes angular movement of the housing about the first pivot axis to bring the first abutment means into engagement with the second abutment means and continued movement in the same direction causes angular movement of the housing about a second pivot axis coincident with the point of engagement of said first and second abutment means, resulting in mutual disengagement of the first and second pivotal engagement means, and the third and fourth abutment means being positioned so that movement of the end of the housing remote from the base member in the opposite direction to said predetermined direction first causes angular movement of the housing about the first pivot axis to bring the third abutment means into engagement with the fourth abutment means and continued movement of the end of the housing remote from the base member in said opposite direction causes angular movement of the housing about a third pivot axis coincident with the point of engagement of said third and fourth abutment means, resulting in mutual disengagement of the first and second pivotal engagement means.

9. An exterior mirror according to claim 8, wherein the resilient means comprises a tension spring extending between a point on the base member which is nearer to the mounting face than the first pivot axis and a point in the interior of the housing which is further from the mounting face than the first pivot axis when the housing is in its position of normal use.

* * * * *